Dec. 26, 1922.
J. N. HANNA.
BATTERY PLATE.
FILED APR. 8, 1922.
1,440,354
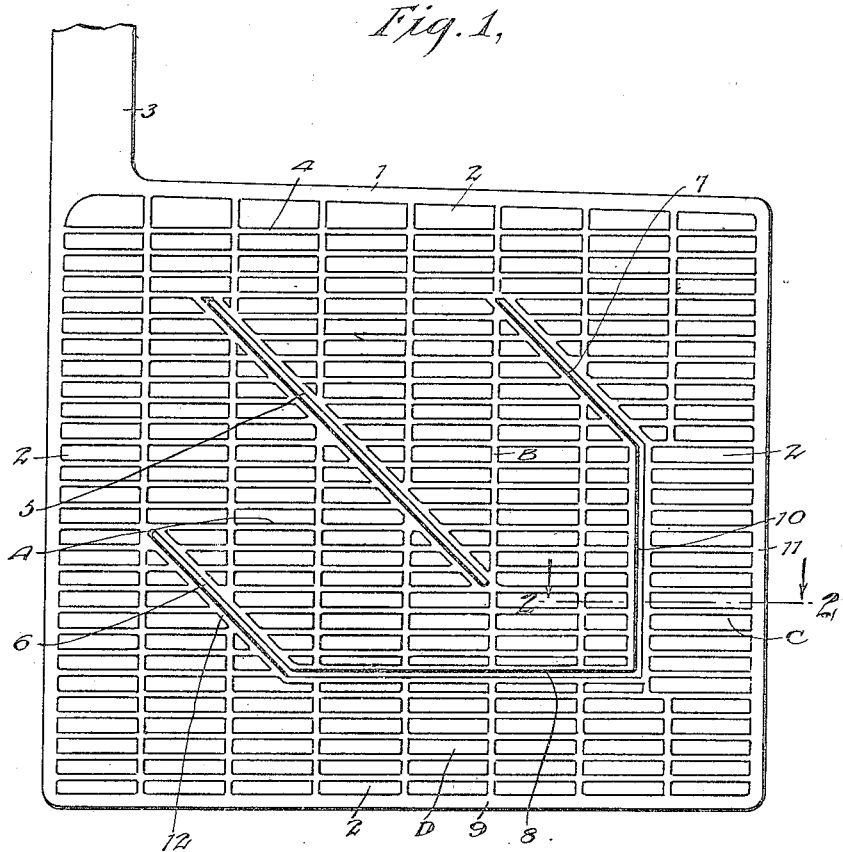
Fig. 1,
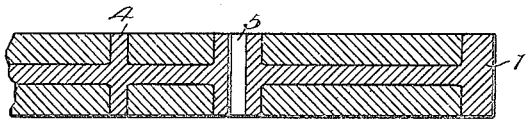
Fig. 2.
WITNESSES
Edw. Thorpe
Robert J. Hubizar
INVENTOR
John N. Hanna
BY
Munn & Co
ATTORNEYS Patented Dec. 26, 1922.

1,440,354

UNITED STATES PATENT OFFICE.

JOHN N. HANNA, OF ORDWAY, COLORADO.

BATTERY PLATE.

Application filed April 8, 1922. Serial No. 550,697.

*To all whom it may concern:*

Be it known that I, JOHN N. HANNA, a citizen of the United States, and a resident of Ordway, in the county of Crowley and State of Colorado, have invented a new and Improved Battery Plate, of which the following is a full, clear, and exact description.

The invention relates to a battery plate, and has particular reference to a storage battery plate construction.

An object of the invention is to provide a simple, strong, durable and efficient frame, constituting the support for the active material of the storage battery plate, which is so constructed as to provide freedom of movement for the various parts of the frame so that in the expansion and contraction of the parts of the frame there will be no tendency for the frame to warp and buckle.

Another object resides in the provision of means in the construction whereby this freedom of movement is most feasibly effected.

A further object resides in the provision of means for permitting freedom of movement of one part of the frame with respect to the other and at the same time provide a most direct course for the current to flow toward the head of the plate from any one of the sections.

A still further object resides in the particular construction and arrangement of parts which are hereinafter described and claimed and shown in the accompanying drawings.

The invention is illustrated in the drawings, of which—

Figure 1 is a side view of the plate or frame.

Figure 2 is a section taken on the line 2—2 of Figure 1.

The form of the invention shown in the drawings is a preferred form, although it is understood that modifications in the construction and arrangement of the parts and in the character of the materials used may be adopted without departing from the spirit of the invention.

The preferred application of my invention shown in the drawings comprises a frame 1 which is adapted to support in the pockets such as 2, of which there may be any number within the frame, the active material for the plate. At one upper corner of this frame I provide a head 3 which is adapted to be connected to suitable terminals in any well known manner. This frame may be molded or cast or punched or formed in any other desired manner. The margins or borders such as 4 between the various pockets 2 are of any desired dimension. In order to permit the various parts of the frame or plate 1 to have the utmost freedom of movement with respect to each other, I provide three slots 5, 6 and 7 extending parallel with each other and diagonally across the frame from the head 3. These slots are spaced apart any desired distance, the central slot 5 preferably being longer than the two outer slots 6 and 7 and approaching at its inner end near to the head 3. The outer ends of the slot 6 are connected by a horizontal slot 8 parallel to the lower edge 9 of the plate or frame, and by a vertical slot 10 extending from the outer end of the slot 8 to the outer end of the slot 7 and parallel to the right-hand edge 11 of the frame 1. It will thus been seen that the slots 6, 7, 8 and 10 form one continuous slot. All these slots have narrow margins or borders such as 12 composed of the same material as the borders 4 above mentioned and of any desired dimensions. These borders serve to hold the active material (not shown) in place and also to form conductors for the electric current to flow in a more direct route toward the head 3. It will be observed that by this division of the frame, sections A, B, C and D are provided which are practically independent of each other, giving freedom of movement, so that a considerable amount of expansion and contraction can take place without any warping or buckling action.

As shown in Fig. 2, the dividing slots, such as 5, 6, 7, 8 and 10, extend all the way through the frame.

What I claim is:

1. A battery plate construction which comprises a frame having a head and adapted to receive active material, said frame provided with a plurality of spaced slots formed in the frame extending diagonally across the frame from the head, the ends of certain of said slots being connected by additional slots extending parallel to the sides of the frame opposite the head.

2. A battery plate construction having a frame adapted to support active material and a head therefor at one corner thereof, said frame having three spaced parallel slots extending diagonally across the plate from the head, the ends of the outermost slots farthest from the head being connected respectively by additional slots intercepting each other in lines parallel to the sides of the frame opposite the head.

3. A battery plate construction having a frame adapted to support active material and a head therefor at one corner thereof, said frame having three spaced parallel slots extending diagonally across the plate from the head, the ends of the outermost slots farthest from the head being connected respectively by additional slots intercepting each other in lines parallel to the sides of the frame opposite the head, the middle slot of the three extending farther from the head than the other.

JOHN N. HANNA.